United States Patent [19]

Squirrell

[11] 4,325,411
[45] Apr. 20, 1982

[54] SEALS FOR GAS ISOLATORS

[75] Inventor: Anton F. Squirrell, Samstagern, Switzerland

[73] Assignee: Grovag Grossventiltechnik A.G., Glarus, Switzerland

[21] Appl. No.: 187,580

[22] Filed: Sep. 15, 1980

[30] Foreign Application Priority Data

Oct. 12, 1979 [GB] United Kingdom ............... 35497/79

[51] Int. Cl.³ ............................................. F16K 11/14
[52] U.S. Cl. .................................. 137/601; 251/174; 251/307
[58] Field of Search ............... 137/601; 251/174, 176, 251/306, 307

[56] References Cited

U.S. PATENT DOCUMENTS

| | | | |
|---|---|---|---|
| 973,606 | 10/1910 | Worley | 251/176 X |
| 2,835,468 | 5/1958 | Sparks | 251/176 X |
| 2,835,469 | 5/1958 | Rothenberger | 251/176 X |
| 3,044,387 | 7/1962 | Hinden | 137/601 X |
| 3,698,429 | 10/1972 | Lowe et al. | 137/601 |
| 4,077,432 | 3/1978 | Herr | 137/601 |

FOREIGN PATENT DOCUMENTS

| | | | |
|---|---|---|---|
| 1308801 | 3/1973 | United Kingdom | 137/601 |
| 1375186 | 11/1974 | United Kingdom | 137/601 |

Primary Examiner—Robert S. Ward, Jr.
Attorney, Agent, or Firm—St. Onge, Steward, Johnston & Reens

[57] ABSTRACT

A seal for a gas isolator which comprises a cantilever leaf spring to be attached to a fixed frame or a movable member of the isolator and a bias spring acting on the leaf spring, wherein the leaf spring is bent or curved when unstressed whereby in the sealing position of the seal the stress induced in the bias spring will be the same as that induced in the leaf spring where the bias spring and the leaf spring seal have the same section modulus per unit length of seal.

5 Claims, 9 Drawing Figures

SEALS FOR GAS ISOLATORS

This invention relates to seals for gas isolators, and is particularly concerned with the type of seal described in British Pat. No. 1,308,801, published Mar. 7, 1973.

Sealing systems for isolating equipment may suitably consist of:
 (1) Woven wire sheaths surrounding a core of asbestos or ceramic fibrous material. The wire may be stainless steel, nickel alloy or other refractory metal wire.
 (2) Seals manufactured from thin metallic strip or shim material.

In the case of the wire sheath covering a fibrous core, the latter is an inherently inelastic material lacking the property of recovery, thus preventing the original form of the seal being regained after deflection.

In the case of seals manufactured from thin metallic strip, it is well known to achieve a relatively gas-tight seal between the movable member and the fixed parts of an isolator by utilizing seals in the form of cantilever spring strips. These seals comprise planar strips of sheet metal, one longitudinal margin of which is secured either to the movable member or to the frame of the isolator. The other, free, margin abuts in the closed position of the isolator against a flat seating on the frame or movable member, respectively. By being pressed against the seating, the free margin of the strip thus forms a seal against the seating. Such sealing arrangements may in particular be applied to an isolator of the louvre or flap type, in which a movable member pivots on hinges or a spindle to open and close the duct, or to a sliding type isolator in which a movable member slides across the duct in a direction inclined or perpendicular to the duct axis.

British Pat. No. 1,308,801 describes an improvement in such sealing systems, according to which cantilever seals provided at the margins of the fixed frame or the movable member of an isolator so as to overlap the margin of the movable member or fixed frame respectively when the isolator is closed to seal the duct each comprise a cantilever leaf spring and at least one bias spring acting on the leaf spring to pre-deflect the leaf spring so as to curve the latter when the seal is not in the sealing position, the bias spring being itself further deflected to press the leaf spring flat against the movable member or fixed frame when the seal is in the sealing position.

In such a sealing construction, in the non-sealing position wherein the bias spring acts on the leaf spring to pre-deflect the latter, because the mutual loads at the point of contact between the bias spring and the leaf spring are necessarily equal then, where the bias spring and the seal have the same section modulus per unit length of seal, the stress induced in the bias spring is equal to that induced in the leaf spring. However, in the sealing position the leaf spring is flat and in its original shape and has zero stress, while the bias spring has been deflected and has a stress equal to twice that occurring therein in the non-sealing position.

In seals manufactured from metallic strip or sheet materials, the elasticity is reduced at elevated temperatures because of the lowering of the yield point of the material or 0.2% proof stress (i.e. the stress at which 0.2% strain occurs in the material), necessitating the use of lower design stresses. In addition the creep rupture properties may dictate a further reduction of design stress in components subject to stress over extended periods of time at high temperature. In cases where materials having relatively low elastic limits are required to enable adequate corrosion resistance to be achieved, and where materials are not available in sheet or strip as thin as would be desirable, the seal deflection obtainable may be limited, even at relatively low temperatures.

In the design of such seals it is therefore necessary to produce the required seal deflection at the lowest possible stress level, or conversely to produce the largest possible deflection consistent with the allowable design stress.

There is thus a need to provide a bias spring type flat seal wherein the stresses induced in the seal are minimized.

The present invention provides a seal for a gas isolator which comprises a cantilever leaf spring to be attached to a fixed frame or a movable member of the isolator and a bias spring acting on the leaf spring, wherein the leaf spring is bent or curved when unstressed whereby in the sealing position of the seal the stress induced in the bias spring will be the same as that induced in the leaf spring where the bias spring and the leaf spring seal have the same section modulus per unit length of seal.

Thus in the seal according to the invention it is arranged that no stress is induced in either the bias spring or the leaf spring in the non-sealing position of the seal, while in the sealing position the stresses induced in the leaf spring and the bias spring are equal where the bias spring and the leaf spring seal have the same section modulus per unit length of seal. Where the section moduli are not the same the stress levels will be inversely proportional to the section moduli. Therefore the stress induced in the bias spring does not at any time exceed that induced in the leaf spring, in contradistinction to the seals described in British Pat. No. 1,308,801.

The cantilever leaf spring of the seal according to the invention which is bent or curved when unstressed may take several forms. For example it may be bent at the point of contact with a clamp bar therefor or at a position spaced from such a point of contact, or may be continuously curved and describe the radius of a circle from its free end to its point of contact with a clamp bar therefor.

The invention will be further described, by way of example only, with reference to the accompanying drawings, in which.

Figure 1A:
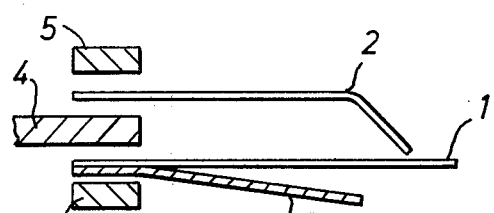
FIGS. 1A, 1B and 1C are schematic views illustrating the construction and operation of a seal of the type described in British Pat. No. 1,308,801.
Figure 1B:
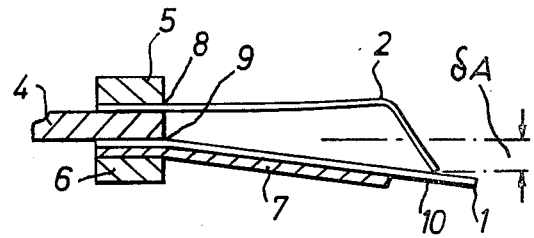
Figure 1C:
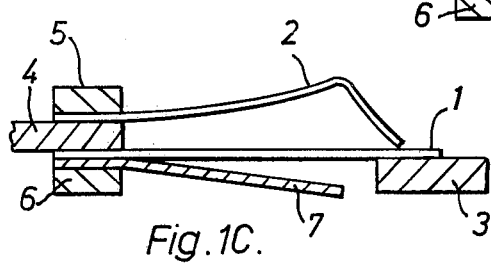

FIGS. 1A, 1B and 1C show a seal which comprises a cantilever leaf spring 1 and a bias spring 2 acting on the leaf spring to curve the latter when the seal is in the non-sealing position as shown in FIG. 1B, the bias spring being itself further deflected to press the leaf spring flat against a co-operating member 3 which will be a fixed frame or a movable closure member of an isolator when the seal is in the sealing position shown in FIG. 1C. The bias spring and the leaf spring are clamped against a support 4 which will be a movable closure member or fixed frame of the isolator by clamp bars 5 and 6 respectively. In addition a support bar 7 underlies the leaf spring 1.

FIG. 1A is an exploded view of the seal; the stresses in the leaf spring 1 and the bias spring 2 are zero.

FIG. 1B shows the assembled seal in its non-sealing position, wherein the initial shape of the bias spring 2 causes a deflection $\delta_B$ of the leaf spring 1. Because the mutual contact loads at the point 10 are necessarily equal the stress at the point 8 is equal to the stress at the point 9 where the bias spring and the leaf spring seal have the same section modulus per unit length of seal.

FIG. 1C shows the seal in its sealing position, wherein the leaf spring 1 is flat and in its original shape and has zero stress. However, the bias spring 2 has been deflected upwards by the amount $\delta_B$ and now has a stress equal to twice that occurring in the non-sealing position shown in FIG. 1B.

Figure 2A:
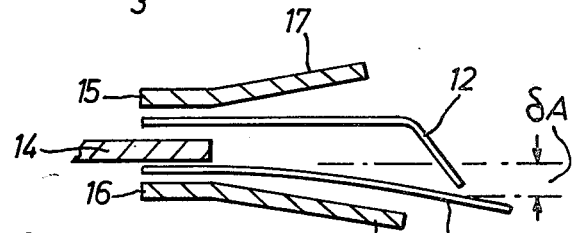
FIGS. 2A, 2B and 2C are views corresponding to FIGS. 1A, 1B and 1C respectively but of a seal according to the present invention.
Figure 2B:
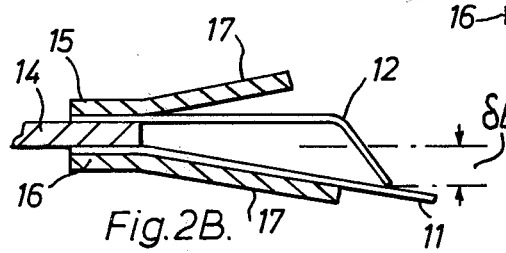
Figure 2C:
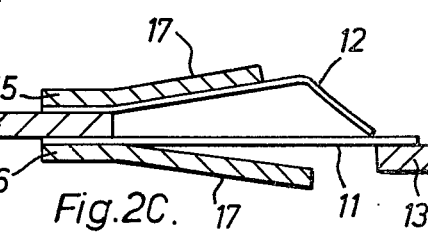

FIGS. 2A, 2B and 2C show a seal according to the invention which comprises a cantilever leaf spring 11 and a bias spring 12. The leaf spring is arranged to press against a co-operating member 13 which will be a fixed frame or a movable closure member of an isolator when the seal is in the sealing position shown in FIG. 2C. The bias spring and the leaf spring are clamped against a support 14 which will be a movable closure member or a fixed frame of an isolator by clamp bars 15 and 16 respectively which in this case are each integral with respective support bars 17.

FIG. 2A is an exploded view of the seal; the stresses in the leaf spring 11 and the bias spring 12 are zero. The leaf spring has an initial preformed deflection of $\delta_A$.

FIG. 2B shows the assembled seal in its non-sealing position. The form of the bias spring 12 is such that it is only in touch contact with the leaf spring 11, and the free deflection $\delta_B = \delta_A$. The stress levels in the biasing spring and the leaf spring are therefore still zero.

FIG. 2C shows the seal in its sealing position. The bias spring 12 and the leaf spring 11 have been deflected by an amount $\delta_B$. Their stress levels are therefore equal where the bias spring and the leaf spring seal have the same section modulus per unit length of seal, and only equal to half of that which exists in the bias spring 2 in the sealing position shown in FIG. 1C for seals of equal section modulus.

The seal according to the invention is preferably fitted with two support bars respectively associated with the leaf spring and bias spring to prevent vibrations occurring of amplitude greater than that occurring in the sealing position. Thus the maximum stress induced under vibrating conditions cannot exceed the value used for the design stress. The support bars and clamp bars may be combined as shown in FIG. 2 or they may be separate components as shown in FIG. 1.

Figure 3A:
FIGS. 3A, 3B and 3C illustrate various forms of the leaf spring of the seal according to the invention.
Figure 3B:
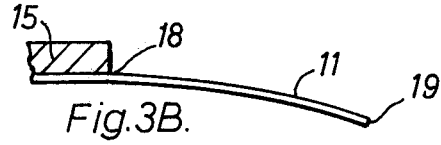
Figure 3C:
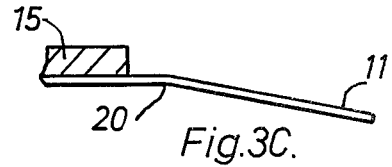

FIGS. 3A, 3B and 3C show various forms of the leaf spring 11 of the seal according to the invention.

In FIG. 3A the leaf spring 11 is bent at the point of contact 18 with the associated clamp bar 15.

In FIG. 3B the leaf spring 11 is continuously curved and describes the radius of a circle from its free end 19 to its point of contact 18 with the clamp bar 15. This construction has the advantage that when the leaf spring is deflected by the amount $\delta_B$ to the sealing position it will lie in a flat plane, which facilitates the construction of corner seals and improves their efficiency.

In FIG. 3C the leaf spring 11 is bent at a point 20 spaced from the point of contact with the clamp bar 15.

The foregoing has assumed simple unlaminated bias springs of the same section modulus per unit length as the leaf spring seal element, but the same principle applies when the bias springs are given additional strength by loose or resistance welded additional laminations. In these cases the stress levels will be inversely proportional to the section moduli.

Thus there is provided a low stress bias spring type flat seal which causes a minimum component stress for a given deflection of the seal, or which gives maximum deflection for a given design stress.

The seal according to the invention provides low component stress to achieve enhanced flexibility for sealing systems for fitting to all types of isolating valves and dampers for exhaust gas ducting from combustion systems or other low pressure product gas, waste gas or air ducted flow systems.

I claim:

1. A seal for a gas isolator which comprises a cantilever leaf spring to be attached to one of a fixed frame and a movable member of the isolator and a bias spring acting on the leaf spring, wherein the leaf spring is not straight when unstressed whereby in the sealing position of the seal the stress induced in the bias spring will be the same as that induced in the leaf spring where the bias spring and the leaf spring seal have the same section modulus per unit length of seal.

2. The seal according to claim 1, wherein the cantilever leaf spring is bent at the point of contact thereof with a clamp bar therefor.

3. The seal according to claim 1, wherein the cantilever leaf spring is bent at a position spaced from the point of contact thereof with a clamp bar therefor.

4. The seal according to claim 1, wherein the cantilever leaf spring is continuously curved from its free end to the point of contact thereof with a clamp bar therefor.

5. The seal according to claim 1, wherein the bias spring and the cantilever leaf spring are each clamped to said one of the fixed frame and movable member by respective clamp bars each integral with a respective support bar.

* * * * *